United States Patent
Chen et al.

(10) Patent No.: US 8,050,549 B2
(45) Date of Patent: Nov. 1, 2011

(54) METHOD AND DEVICE FOR CONTROLLING AUTO MACRO FUNCTION OF LENS MODULE

(75) Inventors: Liang-Jeng Chen, Taipei (TW); Chen-Hung Wu, Taipei (TW); Hsi-Chin Huang, Taipei (TW)

(73) Assignee: Skina Optical Co., Ltd., Taipei (TW)

( * ) Notice: Subject to any disclaimer, the term of this patent is extended or adjusted under 35 U.S.C. 154(b) by 144 days.

(21) Appl. No.: 12/351,938

(22) Filed: Jan. 12, 2009

(65) Prior Publication Data

US 2010/0142937 A1 Jun. 10, 2010

(30) Foreign Application Priority Data

Dec. 5, 2008 (TW) .............................. 97147387 A (51) Int. Cl.
*G03B 3/10* (2006.01)
(52) U.S. Cl. ....................................................... 396/133
(58) Field of Classification Search .................... 396/133
See application file for complete search history.

(56) References Cited

U.S. PATENT DOCUMENTS

| | | | |
|---|---|---|---|
| 6,347,502 B1 * | 2/2002 | deVries ........................... | 56/15.7 |
| 6,759,766 B2 * | 7/2004 | Hiratsuka et al. ............... | 307/110 |
| 6,759,819 B2 * | 7/2004 | Horng et al. ............. | 318/400.32 |
| 7,262,927 B1 * | 8/2007 | Shyu et al. ..................... | 359/823 |
| 7,391,579 B2 * | 6/2008 | Ho et al. ........................ | 359/696 |
| 7,492,538 B2 * | 2/2009 | Ishizawa et al. ............... | 359/824 |
| 7,499,231 B2 * | 3/2009 | Shyu et al. ..................... | 359/824 |
| 2004/0151080 A1 * | 8/2004 | Yabuki et al. ............... | 369/13.17 |
| 2005/0031328 A1 * | 2/2005 | Weng et al. ..................... | 396/85 |
| 2005/0110898 A1 * | 5/2005 | Ryu ............................... | 348/372 |
| 2006/0131965 A1 * | 6/2006 | Friedland ........................ | 310/12 |
| 2006/0213489 A1 * | 9/2006 | Moran et al. .................. | 123/651 |
| 2007/0110424 A1 * | 5/2007 | Iijima et al. .................... | 396/133 |
| 2007/0159526 A1 * | 7/2007 | Abe ................................ | 348/65 |
| 2007/0229001 A1 * | 10/2007 | McIntosh et al. ............. | 315/307 |
| 2009/0051464 A1 * | 2/2009 | Atsumo ......................... | 333/139 |
| 2010/0074607 A1 * | 3/2010 | Topliss et al. ................. | 396/133 |

* cited by examiner

*Primary Examiner* — W. B. Perkey
*Assistant Examiner* — Linda B Smith
(74) *Attorney, Agent, or Firm* — Kile Goekjian Reed & McManus PLLC (57) ABSTRACT

A method for controlling an auto macro function of a lens module is provided. Firstly, a control switching module is provided. The both terminals of the coil of the lens module are connected to a power source and the control switching module, respectively. In response to a first signal state of a control signal, a constant current is transmitted from the power source to the coil. The magnets attached on the magnet yoke provide a permanent magnetic field, and the constant current passing through the coil causes a magnetic force to be generated on the coil while moving the lens holder toward the magnet yoke by a constant distance. In response to a second signal state of the control signal, the power source stops transmitting the constant current to the coil, wherein a restoring force generated by the deformed spring causes the lens holder to return to its original position.

21 Claims, 6 Drawing Sheets

METHOD AND DEVICE FOR CONTROLLING AUTO MACRO FUNCTION OF LENS MODULE

CROSS-REFERENCE TO RELATED APPLICATION

This application claims priority under 35 U.S.C. §119 to Taiwan Patent Application No. 097147387, filed on Dec. 5, 2008, in the Taiwan Intellectual Property Office, the entire contents of which are hereby incorporated by reference.

FIELD OF THE INVENTION

The present invention relates to a method and a device for controlling an auto macro function of a lens module, and more particularly to a method and a device for controlling an auto macro function of a lens module that is driven by a voice coil motor.

BACKGROUND OF THE INVENTION

As known, a lens module that is driven by a voice coil motor (VCM) is advantageous for reducing the overall size of the lens module and lowering the product price. Nowadays, the voice coil motor is applied to the lens module having an auto focus function and/or an auto macro function. The auto focus function enables the optical system to obtain correct focus on a subject without requiring the operator to manually adjust focus. The auto macro function allows for close-up shots when the distant from the subject is very short. As known, the method and the device currently used to control the auto macro function of a VCM-driven lens module are very complicated and costly.

Figure 1:
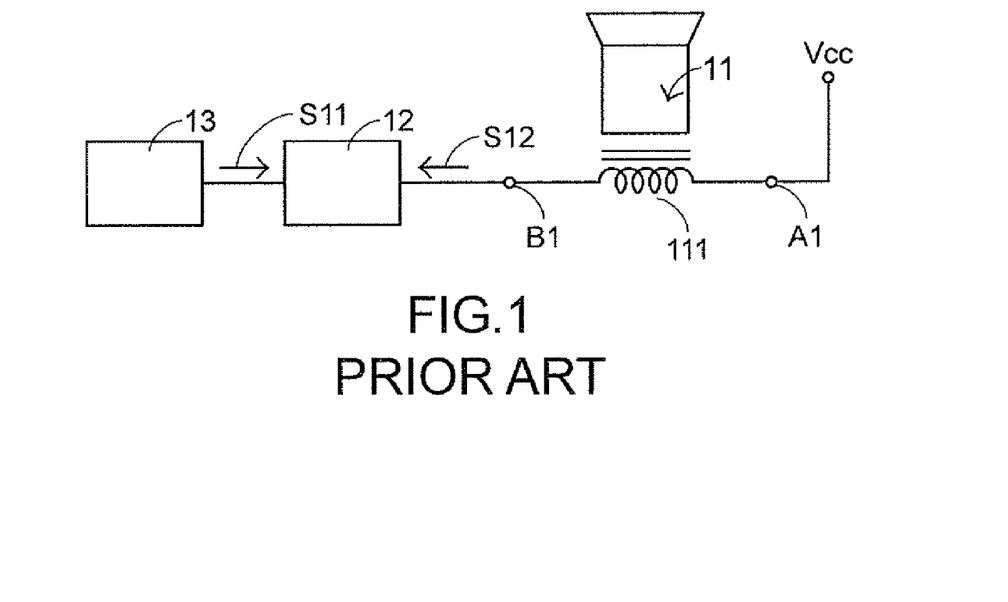
FIG. 1 is a schematic circuit block diagram illustrating a device for controlling an auto focus function of a lens module according to the prior art.

FIG. 1 is a schematic circuit block diagram illustrating a device for controlling an auto focus function of a lens module according to the prior art. As shown in FIG. 1, the lens module 11 has a coil 111. The coil 111 has a first terminal A1 and a second terminal B1. The controlling device 10 principally comprises a multi-stage controlling module 12 and a micro processor 13. The multi-stage controlling module 12 and the lens module 11 are connected to each other in series. The micro processor 13 and the multi-stage controlling module 12 are connected to each other in series. The first terminal A1 is electrically connected to a power source Vcc. The second terminal B1 is electrically connected to the multi-stage controlling module 12.

Hereinafter, the operations of the controlling device 10 will be illustrated with reference to FIG. 1 First of all, a control signal S11 is issued from the micro processor 13 to the multi-stage controlling module 12 according to a desired focal length. In response to the control signal S11, the power source Vcc issues a current S12 to the multi-stage controlling module 12. The current S12 is a variable current with various electric levels, and a specified electric level of the variable current S11 is selected according to the desired focal length. The lens module 11 has a magnetic yoke (not shown) and several magnets (not shown), wherein the magnets are attached on the magnetic yoke to provide a permanent magnet field. The magnets axially surround the coil 111 and are separated from the coil 111 by a gap. When the variable current S12 passes through the coil 111, a magnetic force will be generated on the coil 45 while applying moving the lens holder that carries an optical lens (not shown). As such, the optical length of the lens is shifted by a specific distance so as to obtain correct focus on a subject.

In other words, the conventional controlling device 10 and the conventional controlling method as described in FIG. 1 are mainly applied to control the auto focus function of the lens module 11. In response to the control signal S11, the electric levels of the variable current S12 are adjusted according to the desired focal length. Since the electric levels of the variable current S12 are adjustable, the lens of the lens module can be moved to a specified distance when a proper magnitude of the variable current S12 passes through the coil 111. Generally, the multi-stage controlling module 12 is implemented by a driver IC because the process of performing the auto focus function is very complicated.

For implementing an auto macro function on the basis of the controlling device 10, many manufacturers may alter some operating modes of the driver IC of the multi-stage controlling module 12. For example, except that the maximum focal length mode and the minimum focal length mode are enabled, the other focal length modes of the driver IC are disabled. Alternatively, the driver IC may change the flowing direction of the variable current S12 to move forward or backward the lens of the lens module 11 in order to implement the auto macro function.

Since the use of the driver IC to implement the auto macro function of the lens module is very costly, there is a need of providing a cost-effective device for controlling the auto macro function of the lens module.

SUMMARY OF THE INVENTION

It is an object of the present invention to provide a cost-effective and simplified device for controlling an auto macro function of a lens module.

Another object of the present invention provides a simplified method for controlling an auto macro function of a lens module.

In accordance with an aspect of the present invention, there is provided a method for controlling an auto macro function of a lens module. The lens module includes an upper coupling element, a single spring disposed under the upper coupling element, a magnet yoke disposed under the single spring, multiple magnets, a lens holder supporting a coil and a lens, and a lower coupling element. The coil has a first terminal connected to a power source. The method includes the following steps. Firstly, a control switching module is provided. The control switching module is operated at either a first switching state or a second switching state and connected to a second terminal of the coil in series Then, a control signal is issued to the control switching module. When the control switching module is operated at the first switching state in response to the control signal, a constant current is transmitted from the power source to the coil. The magnets attached on the magnet yoke provide a permanent magnetic field, and the constant current passing through the coil causes a magnetic force to be generated on the coil while moving the lens holder toward the magnet yoke by a constant distance, so that the lens holder is sustained against sustained against the spring. When the control switching module is operated at the second switching state in response to the control signal, the power source stops transmitting the constant current to the coil, wherein a restoring force generated by the deformed spring causes the lens holder to return to its original position.

In an embodiment, the single spring is a single flat spring including a lower inner rim, an upper outer rim and an elastic serpentine structure between the lower inner rim and the upper outer rim, which are connected with each other and disposed on the same plane.

In an embodiment, the magnet yoke includes a cylindrical inner wall, an outer wall and a top wall. The top wall is outwardly extended from an upper edge of the cylindrical inner wall, and the outer wall is downwardly and axially extended from a periphery of the top wall.

In an embodiment, the outer wall includes multiple extension slices. The magnets are attached on inner surfaces of respective extension slices of the magnet yoke. The multiple extension slices of the magnet yoke have rectangular shapes and are substantially perpendicular to the top wall and arranged at diametrically opposed locations of the top wall at regular intervals.

In an embodiment, the outer wall is annular and downwardly and axially extended from a periphery of the top wall such that the outer wall encloses the cylindrical inner wall.

In an embodiment, at least one flange is circumferentially and outwardly extended from a lower periphery of the lens holder for supporting the coil. The at least one flange includes two horizontal protrusions circumferentially and outwardly extended from the lower periphery of the lens holder and arranged at regular intervals, or the flange is an annular flange circumferentially and outwardly extended from the lower periphery of the lens holder.

In an embodiment, the constant distance is determined according to a gap between the flange and a bottom of the cylindrical inner wall of the magnet yoke. Alternatively, the constant distance is determined according to a gap between several salient structures on an upper edge of the lens holder and a bottom of the upper coupling element.

In an embodiment, the control switching module includes a transistor and a current-limiting resistor. The first switching state and the second switching state indicate that the transistor is in a saturation mode and a cutoff mode, respectively. The control switching module is operated at the first switching state when the transistor is in a saturation mode in response to the control signal at the first signal state. The control switching module is operated in the second switching state when the transistor is in a cutoff mode in response to the control signal at the second signal state.

In an embodiment, the first signal state and the second state are a high-level state and a low-level state, respectively.

In accordance with another aspect of the present invention, there is provided a method for controlling an auto macro function of a lens module. The lens module includes a magnet yoke, multiple magnets attached on the magnet yoke, a single spring disposed above the magnet yoke and a lens holder supporting a coil and a lens. The magnets axially surround the coil and are separated from the coil by a gap.

The method includes the following steps. Firstly, a power source is connected with a first terminal of the coil. A control switching module is connected to a second terminal of the coil and a ground terminal such that the power source, the coil, the control switching module and the ground terminal are connected in series. The control switching module is operated at either a first switching state or a second switching state. Then, a control signal having a first signal state and a second signal state is issued to the control switching module. When the control switching module is operated at the first switching state in response to the control signal at the first signal state, a constant current is transmitted from the power source to the coil. The magnets attached on the magnet yoke provide a permanent magnetic field, and the constant current passing through the coil causes a magnetic force to be generated on the coil while moving the lens holder toward the magnet yoke by a constant distance, so that the lens holder is sustained against sustained against the spring, when the control switching module is operated at the second switching state in response to the control signal at the second signal state, the power source stops transmitting the constant current to the coil, wherein a restoring force generated by the deformed spring causes the lens holder to return to its original position.

In accordance with a further aspect of the present invention, there is provided a device for controlling an auto macro function of a lens module. The lens module includes a magnet yoke, multiple magnets attached on the magnet yoke, a single spring disposed above the magnet yoke and a lens holder supporting a coil and a lens. The magnets axially surround the coil and are separated from the coil by a gap. The controlling device includes a power source, a control switching module and a micro processor. The power source is connected with a first terminal of the coil. The control switching module is operated at either a first switching state or a second switching state. The control switching module is connected to a second terminal of the coil and a ground terminal such that the power source, the coil, the control switching module and the ground terminal are connected in series. The micro processor issues a control signal having a first signal state and a second signal state to the control switching module. The magnets attached on the magnet yoke provide a permanent magnetic field. When the control switching module is operated at the first switching state in response to the control signal at the first signal state, a constant current is transmitted from the power source to the coil. The constant current passing through the coil causes a magnetic force to be generated on the coil while moving the lens holder toward the magnet yoke by a constant distance, so that the lens holder is sustained against sustained against the spring. When the control switching module is operated at the second switching state in response to the control signal at the second signal state, the power source stops transmitting the constant current to the coil, so that a restoring force generated by the deformed spring causes the lens holder to return to its original position.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

It is to be noted that the following descriptions of preferred embodiments of this invention are presented herein for purpose of illustration and description only. It is not intended to be exhaustive or to be limited to the precise form disclosed.

The present invention relates to a method and a device for controlling an auto macro function of a lens module that is driven by a voice coil motor.

Figure 2:
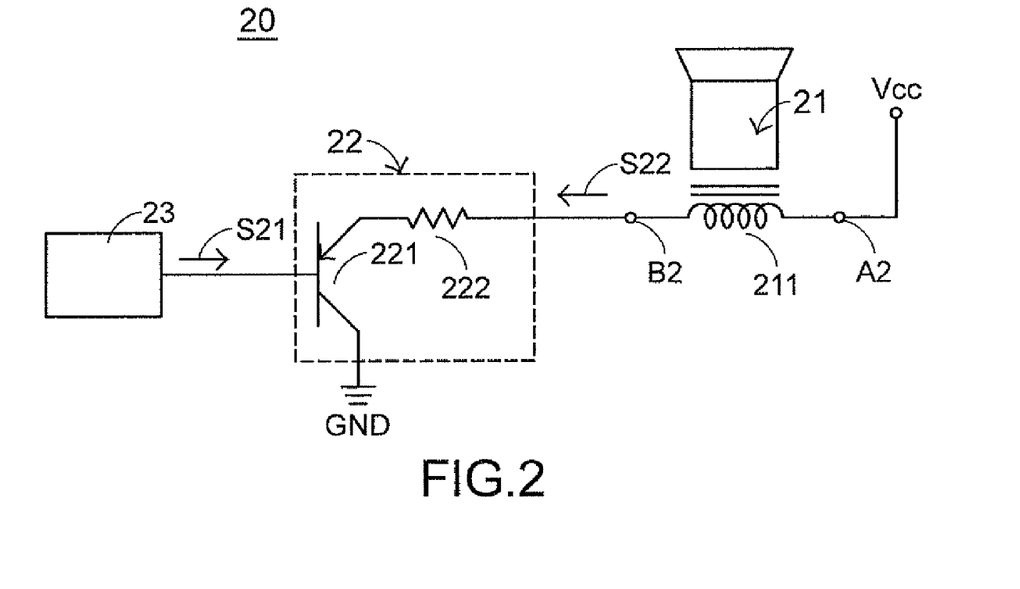
FIG. 2 is a schematic circuit block diagram illustrating a device for controlling an auto focus function of a lens module according to a preferred embodiment of the present invention.

FIG. 2 is a schematic circuit block diagram illustrating a device for controlling an auto focus function of a lens module according to a preferred embodiment of the present invention. As shown in FIG. 2, the lens module 21 has a coil 211. The controlling device 20 principally comprises a control switching module 22 and a micro processor 23. The control switching module 22 and the lens module 21 are connected with each other in series. The micro processor 23 and the control switching module 22 are connected with each other in series. The coil 211 has a first terminal A2 and a second terminal B2. The first terminal A2 is electrically connected to a power source Vcc. The second terminal B2 is electrically connected to the control switching module 22.

As shown in FIG. 2, the control switching module 22 comprises a transistor 221 and a current-limiting resistor 222. The transistor 221 is connected to the current-limiting resistor 222, the micro processor 23 and a ground terminal GND. In replace of using the costly and complicated driver IC as shown in FIG. 1, the control switching module 22 of the controlling device 20 according to the present invention utilizes a single electronic switch (i.e. the transistor 221) to implement the auto macro function.

Figure 4:
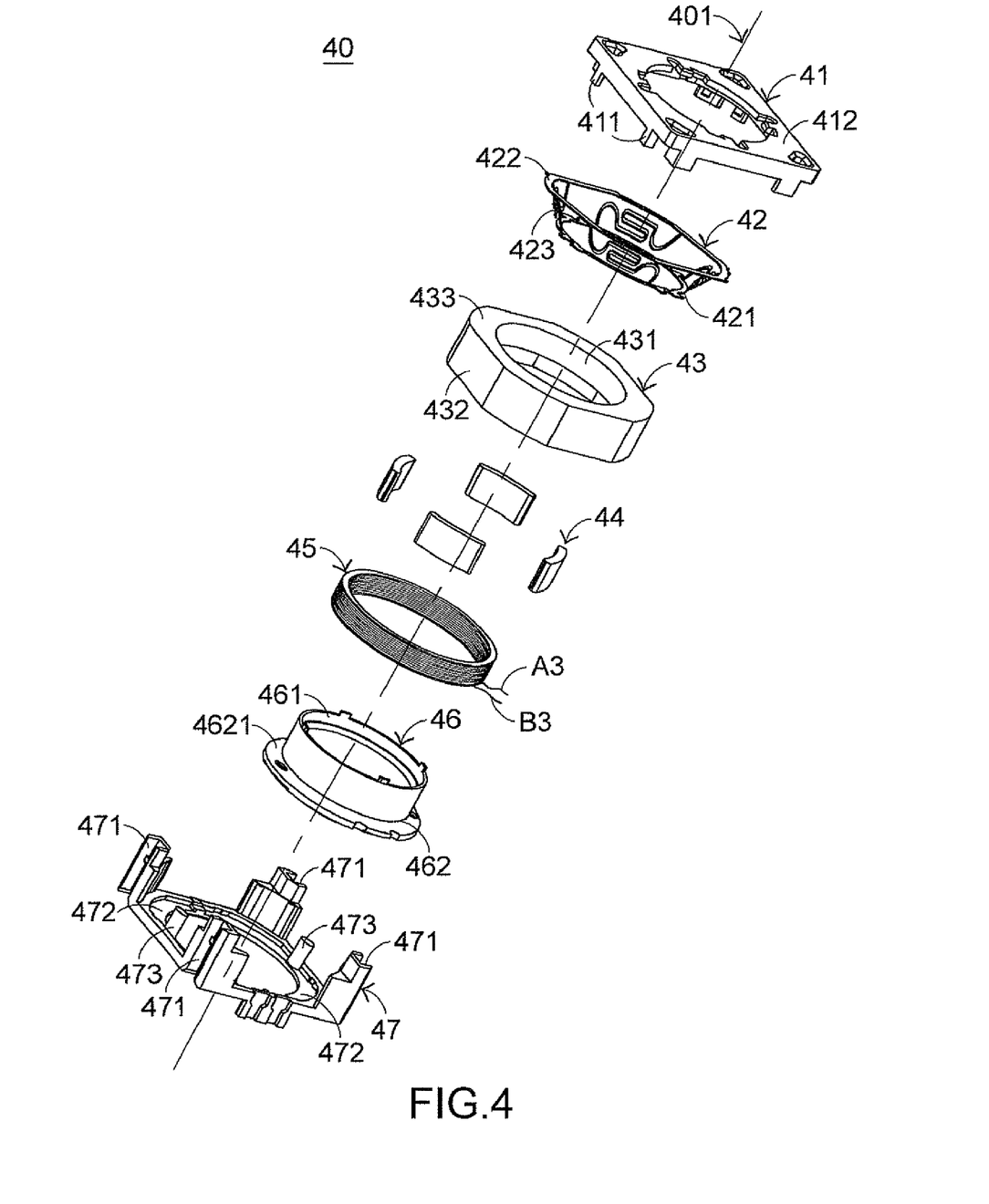
FIG. 4 is a schematic exploded view illustrating a lens module that is driven by a voice coil motor according to a preferred embodiment of the present invention.
Figure 5:
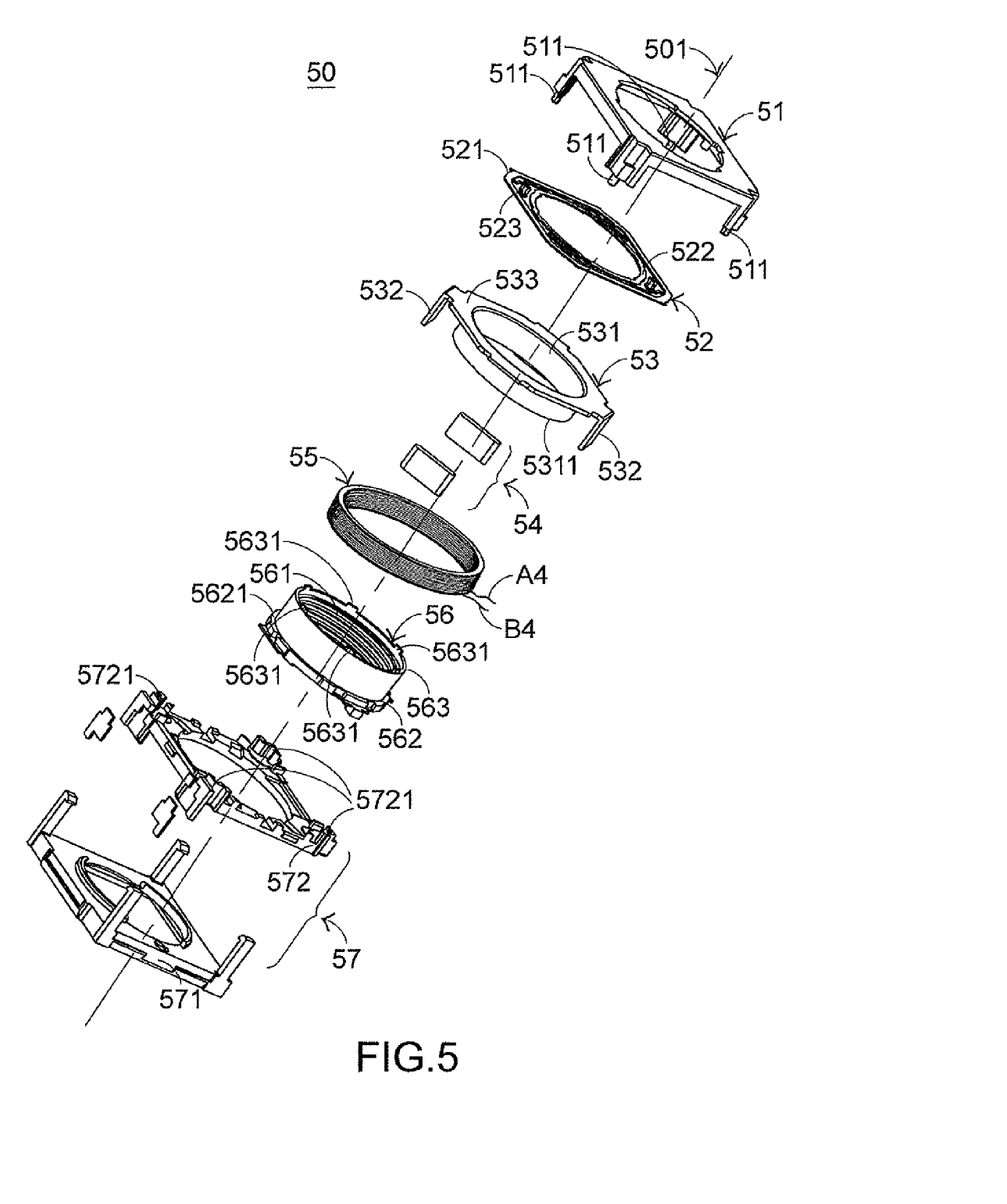
FIG. 5 is a schematic exploded view illustrating a lens module that is driven by a voice coil motor according to another preferred embodiment of the present invention.

In a case that the control signal S21 issued by the micro processor 23 is at a first signal state (e.g. a low-level state), the transistor 221 is operated in the saturation mode and thus a constant current S22 is transmitted from the power source Vcc to the ground terminal GND through the coil 211, the current-limiting resistor 222 and the transistor 221. Since the magnets attached on the magnet yoke of the lens module 21 provide a permanent magnetic field and the magnets axially surrounding the coil and is separated from the coil by a gap (as shown in FIGS. 4 and 5), the constant current S22 passing through the coil 211 will cause a magnetic force to be generated on the coil 211 while moving the lens holder toward the magnet yoke by a constant distance. As such, the auto macro function is implemented. During the lens holder is moved toward the magnet yoke, the top edge of the lens holder is sustained against the spring that is disposed above the magnet yoke (as will be described in FIGS. 4 and 5).

Whereas, in a case that the control signal S21 issued by the micro processor 23 is at a second signal state (e.g. a high-level state), the transistor 221 is operated in the cutoff mode and the power source Vcc stops transmitting the constant current S22 to the coil 211. Meanwhile, the magnetic force generated on the coil 211 is eliminated. As such, the restoring force generated by the deformed spring will cause the lens holder to return to its original position.

Figure 3:
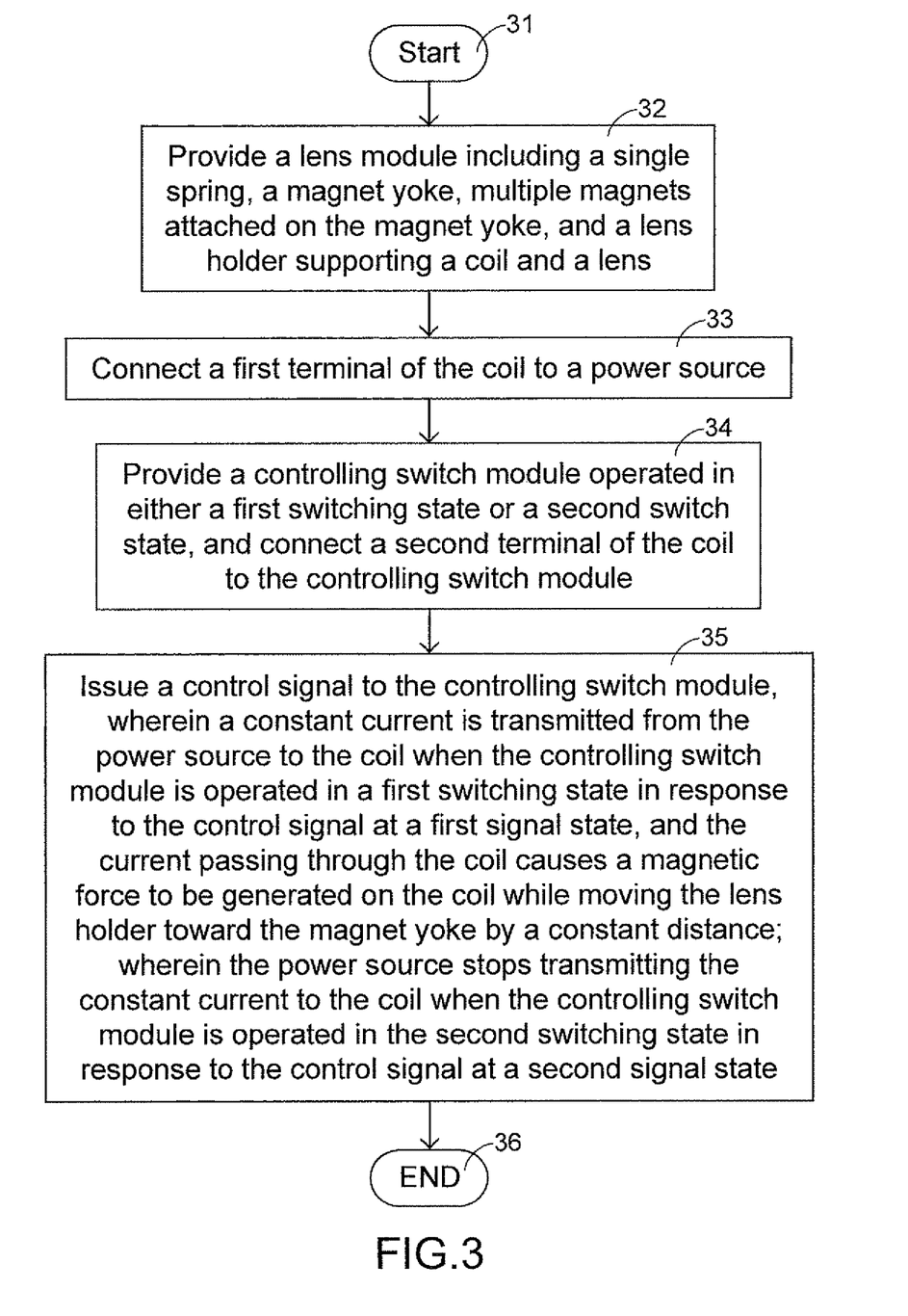
FIG. 3 is a flowchart illustrating a method of controlling an auto focus function of a lens module of the present invention.

Hereinafter, a method of controlling an auto focus function of a lens module will be illustrated with reference to a flowchart of FIG. 3, the controlling device of FIG. 2 and the lens module of FIG. 4 or FIG. 5.

After the controlling method is started (Step 31), a lens module including a magnet yoke, multiple magnets attached on the magnet yoke, a single spring disposed above the magnet yoke and a lens holder supporting a coil and a lens is provided, wherein the magnets axially surrounds the coil and is separated from the coil by a gap (Step 32). Next, a power source Vcc is connected to the first terminal A2 of the coil (Step 33). Next, a control switching module is provided, wherein the control switching module is operated at either a first switching state or a second switching state and connected between the second terminal B2 of the coil and the ground terminal GND such that the power source Vcc, the coil, the control switching module and the ground terminal GND are connected in series (Step 34). Next, a control signal having a first signal state and a second signal state is transmitted to the control switching module, wherein the magnets attached on the magnet yoke provide a permanent magnetic field, a constant current is transmitted from the power source to the coil when the control switching module is operated at the first switching state in response to the control signal at the first signal state, and the current passing through the coil causes a magnetic force to be generated on the coil while moving the lens holder toward the magnet yoke by a constant distance, so that the lens holder is sustained against sustained against the spring, wherein the power source stops transmitting the constant current to the coil when the control switching module is operated at the second switching state in response to the control signal at the second signal state, so that a restoring force generated by the deformed spring causes the lens holder to return to its original position (Step 35). Meanwhile, the method of controlling the auto focus function of the lens module is completed (Step 36).

FIG. 4 is a schematic exploded view illustrating an exemplary lens module that is driven by a voice coil motor and has an auto macro function according to the present invention. The lens module 40 principally an upper coupling element 41, a spring 42, a magnet yoke 43, several magnets 44, a coil 45, a lens holder 46, and a lower coupling element 47.

As shown in the drawings, several engaging posts 411 are extended downwardly from the edges of the upper coupling element 41 along the axial direction 401. The spring 42 is disposed under the upper coupling element 41. An elastic serpentine structure 423 is arranged between a lower inner rim 421 and an upper outer rim 422 of the spring 42. The lower inner rim 421 and the upper outer rim 422 are disposed on different planes in the spatial space. The magnet yoke 43 is disposed under the spring 42. The magnet yoke 43 has a cylindrical inner wall 431, an outer wall 432 and a top wall 433. The top wall 433 is outwardly extended from the upper edge of the cylindrical inner wall 431. The outer wall 432 is extended downwardly from the periphery of the top wall 433 along the axial direction 401 such that the outer wall 432 encloses the cylindrical inner wall 431. In addition, the axial height of the cylindrical inner wall 431 is smaller than the outer wall 432. Moreover, the magnets 44 are attached on the inner surface of the outer wall 432 of the magnet yoke 43.

The lens holder 46 is tubular and has a thread structure 461 formed on the inner surface thereof, so that a lens (no shown) is fixed onto the thread structure 461. In addition, an annular flange 4621 is circumferentially and outwardly extended from the lower periphery 462 of the lens holder 46 so as to support the coil 45 thereon. During the lens module 40 is operated, the annular flange 4621 is sustained against the bottom of the cylindrical inner wall 431 of the magnet yoke 43. The coil 45 has a first terminal A3 and a second terminal B3. The first terminal A3 is electrically connected to a power source Vcc as shown in FIG. 2. The second terminal B3 is electrically connected to the control switching module 22 as shown in FIG. 2.

The lower coupling element 47 has several engaging grooves 471 and several retaining posts 473. The engaging grooves 471 mate with the engaging posts 411 of the upper coupling element 41. The retaining posts 473 are disposed on the lower surface of the lower coupling element 47. Via the engagement between the engaging grooves 471 and the engaging posts 411, the upper coupling element 41, the spring 42, the magnet yoke 43 with the attached magnets 44, the lens holder 46 with the supported coil 45, and the lower coupling element 47 are combined together to assemble the lens module 40.

FIG. 5 is a schematic exploded view illustrating another exemplary lens module that is driven by a voice coil motor and has an auto macro function according to the present invention. The lens module 40 principally an upper coupling element 51, a spring 52, a magnet yoke 53, several magnets 54, a coil 55, a lens holder 56, and a lower coupling element 57 including a lower case 571 and a base 572.

As shown in the drawings, several engaging posts 511 are extended downwardly from the edges of the upper coupling element 51 along the axial direction 501. The spring 52 is a single flat spring and disposed under the upper coupling element 51. An elastic serpentine structure 523 is arranged between a lower inner rim 521 and an upper outer rim 522 of the spring 52. The lower inner rim 521, the upper outer rim 522 and the elastic serpentine structure 523 are connected with each other and disposed on the same plane.

The magnet yoke 53 is disposed under the spring 52. The magnet yoke 53 has a cylindrical inner wall 531, a plurality of extension slices 532 and a top wall 533. The top wall 533 is outwardly extended from the upper edge of the cylindrical inner wall 531. The extension slices 532 are extended downwardly from the periphery of the top wall 533 along the axial direction 501 such that the extension slices 532 are concentric with the cylindrical inner wall 531 and circumferentially arranged on the top wall 533 at regular intervals. In addition, the axial height of the cylindrical inner wall 531 is smaller than the axial height of each extension slice 532. The magnets 54 are attached on the inner surfaces of the extension slices 532 of the magnet yoke 53. Moreover, the extension slices 532 of the magnet yoke 53 have rectangular shapes and are substantially perpendicular to the top wall 533. In this embodiment, the magnet yoke 53 has two extension slices 532 which are arranged at two diametrically opposed locations of the top wall 533.

Figure 6A:
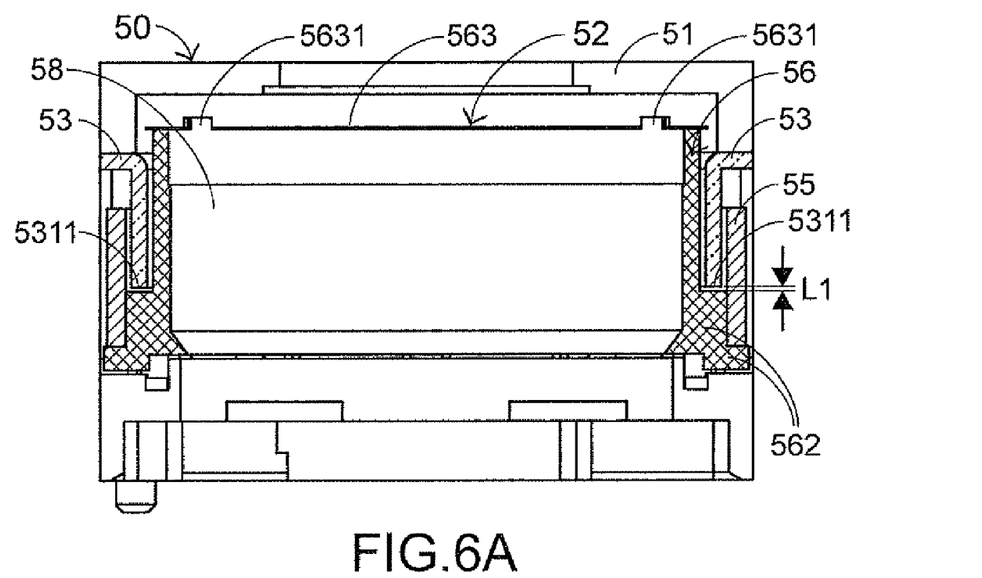
FIGS. 6A and 6B are schematic cross-sectional views illustrating the actions of implementing an auto macro function by using the lens module of the present invention.

The lens holder 56 is tubular and has a thread structure 561 formed on the inner surface thereof, so that a lens 58 (as shown in FIG. 6A) is fixed onto the thread structure 561. At least two flanges 5621 are circumferentially and outwardly extended from the lower periphery 562 of the lens holder 56 and arranged at regular intervals. As such, the coil 55 is sheathed around the lens holder 56 and supported on the flanges 5621. The coil 55 has a first terminal A4 and a second terminal B4. The first terminal A4 is electrically connected to a power source Vcc as shown in FIG. 2. The second terminal B4 is electrically connected to the control switching module 22 as shown in FIG. 2. Each of the flanges 5621 of the lens holder 56 is substantially a horizontal protrusion. The flanges 5621 are circumferentially and outwardly extended from the lower periphery 562 of the lens holder 56 and arranged at regular intervals.

The base 572 of the lower coupling element 57 has several engaging grooves 5721. The engaging grooves 5721 mate with the engaging posts 511 of the upper coupling element 51. Via the engagement between the engaging grooves 5721 and the engaging posts 511, the upper coupling element 51, the spring 52, the magnet yoke 53 with the attached magnets 54, the lens holder 56 with the supported coil 55 and the lower coupling element 57 are combined together to assemble the lens module of the present invention.

Figure 6B:
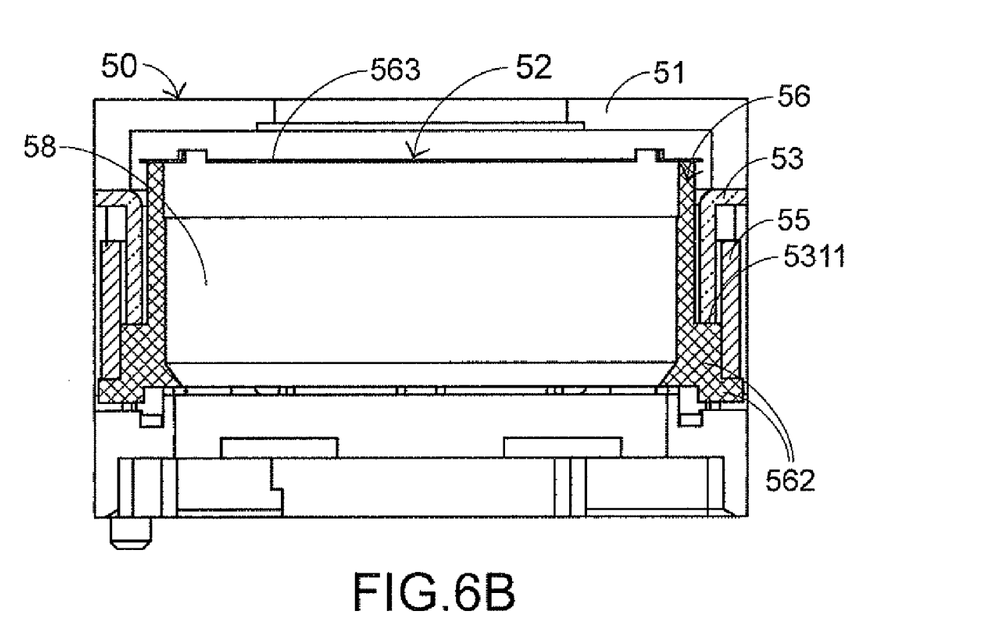

Hereinafter, the principles of implementing the auto macro function of the lens module 50 shown in FIG. 5 will be illustrated with reference to FIGS. 6A and 6B and FIG. 2.

In a case that the transistor 221 is in the saturation mode, the constant current S22 is transmitted from the power source Vcc to the coil 55. Since the magnets 54 attached on the magnet yoke 53 provide a permanent magnetic field, the constant current S22 passing through the coil 55 will cause a magnetic force to be generated on the coil 55 while moving the lens holder 56 toward the magnet yoke 53 by a constant distance L1 (as shown in FIG. 6A). As such, the flanges 5621 are sustained against the bottom 5311 of the cylindrical inner wall 531 of the magnet yoke 53 (as shown in FIG. 6B). During the lens holder 56 is moved toward the magnet yoke 53, the lens 58 that is fixed on the lens holder 56 is synchronously moved. At the same time, the top edge of the lens holder 56 is sustained against the spring 52 and thus the spring 52 is subject to deformation.

In a case that the transistor 221 is at the cutoff state, the power source Vcc stops transmitting the constant current S22 to the coil 55. The restoring force generated by the deformed spring 52 will cause the lens holder to return to its original position (as shown in FIG. 6A).

Figure 7A:
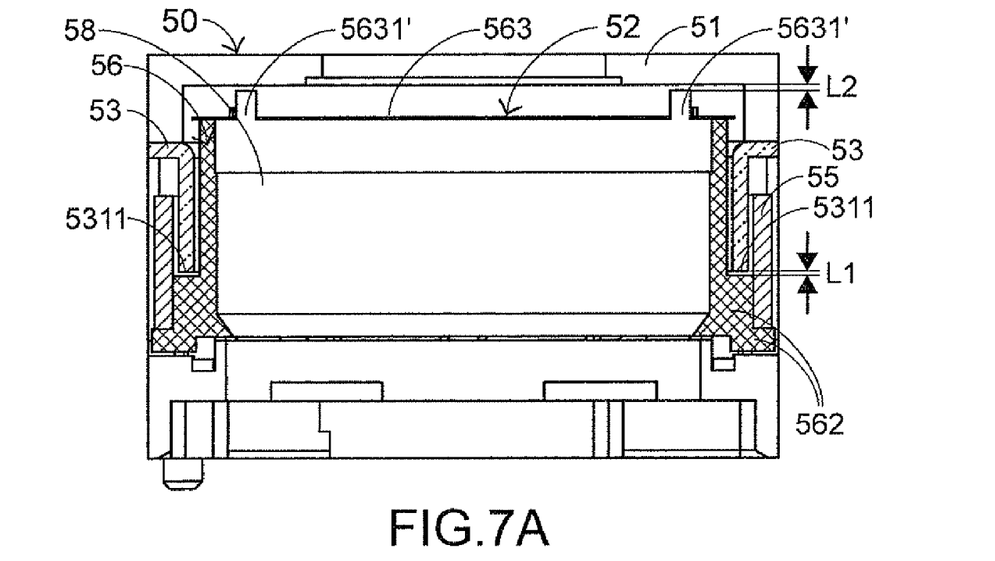
FIGS. 7A and 7B are schematic cross-sectional views illustrating the actions of implementing an auto macro function by using another exemplary lens module of the present invention.
Figure 7B:
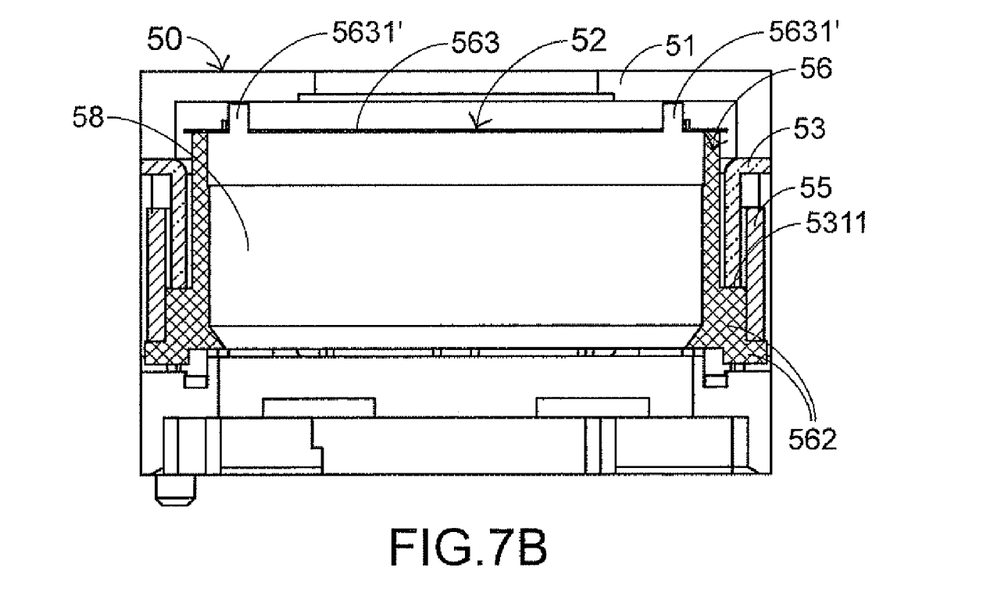

Please refer to FIGS. 5, 6A and 6B again. Several salient structures 5631 are protruded from the top edge 563 of the lens holder 56 for facilitating confining the spring 52 in position. In order to enhance the confining efficacy, the salient structures may be extended. FIGS. 7A and 7B are schematic cross-sectional views illustrating the actions of implementing an auto macro function by using another exemplary lens module of the present invention. As shown in FIGS. 7A and 7B, several salient structures 5631' are protruded from the top edge 563 of the lens holder 56. In a case that no current passes through the coil 55, the salient structures 5631' are slightly separated from the bottom of the upper coupling element 51 such that a gap L2 is existed between the salient structure 5631' and the bottom of the upper coupling element 51 (as shown in FIG. 7A). In a case that the transistor 221 is in the saturation mode, the constant current S22 passing through the coil 55 will cause a magnetic force to be generated on the coil 55 while moving the lens holder 56 toward the magnet yoke 53 by the constant distance L2. As such, the salient structures 5631' are sustained against the bottom of the upper coupling element 51 (as shown in FIG. 7B). In other words, the constant distance by which the lens holder 56 is moved can be determined according to the gap between the flanges 5621 and the bottom 5311 of the cylindrical inner wall 531 of the magnet yoke 53 (as shown in FIGS. 6A and 6B) or the gap between the salient structure 5631' and the bottom of the upper coupling element 51.

From the above description, it is found that the method and the device for controlling the auto macro function of the lens module according to the present invention are simplified and cost-effective in comparison with the prior art.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for controlling an auto macro function of a lens module, said lens module comprising an upper coupling element, a single spring and said single spring disposed under said upper coupling element, a magnet yoke disposed under said single spring, multiple magnets, a lens holder supporting a coil and a lens, and a lower coupling element, said coil having a first terminal connected to a power source, said method comprising steps of:

providing a control switching module operated at either a first switching state or a second switching state, wherein said control switching module includes a current-limiting resistor and a transistor having a base and two terminals, and one of said two terminals of said transistor is connected to a second terminal of said coil in series;

issuing a control signal to said control switching module;

transmitting a constant current from said power source to said coil when said control switching module is operated at said first switching state in response to said control signal, wherein said magnets attached on said magnet yoke provide a permanent magnetic field, and said constant current passing through said coil causes a magnetic force to be generated on said coil while moving said lens holder toward said magnet yoke by a constant distance, so that said lens holder is sustained against said spring, and stopping transmitting said constant current from said power source to said coil when said control switching module is operated at said second switching state in response to said control signal, wherein a restoring force generated by said deformed spring causes said lens holder to return to its original position.

2. The method according to claim 1 wherein said single spring is a single flat spring including a lower inner rim, an upper outer rim and an elastic serpentine structure between said lower inner rim and said upper outer rim, which are connected with each other and disposed on the same plane.

3. The method according to claim 1 wherein said magnet yoke comprises a cylindrical inner wall, an outer wall and a top wall, wherein said top wall is outwardly extended from an upper edge of said cylindrical inner wall, and said outer wall is downwardly and axially extended from a periphery of said top wall, and wherein said outer wall comprises multiple extension slices, said magnets are attached on inner surfaces of respective extension slices of said magnet yoke, and said multiple extension slices of said magnet yoke have rectangular shapes and are substantially perpendicular to said top wall and arranged at diametrically opposed locations of said top wall at regular intervals.

4. The method according to claim 3 wherein said outer wall is annular and downwardly and axially extended from a periphery of said top wall such that said outer wall encloses said cylindrical inner wall.

5. The method according to claim 3 wherein at least one flange is circumferentially and outwardly extended from a lower periphery of said lens holder for supporting said coil, wherein said at least one flange includes two horizontal protrusions circumferentially and outwardly extended from said lower periphery of said lens holder and arranged at regular intervals, or said flange is an annular flange circumferentially and outwardly extended from said lower periphery of said lens holder.

6. The method according to claim 5 wherein said constant distance is determined according to a gap between said flange and a bottom of said cylindrical inner wall of said magnet yoke, or said constant distance is determined according to a gap between several salient structures on an upper edge of said lens holder and a bottom of said upper coupling element.

7. The method according to claim 5 wherein said control signal has a first signal state and a second signal state, wherein said control switching module is operated at said first switching state when said transistor is in a saturation mode in response to said control signal at said first signal state, and said control switching module is operated at said second switching state when said transistor is in a cutoff mode in response to said control signal at said second signal state.

8. The method according to claim 7 wherein said first signal state and said second state are a high-level state and a low-level state, respectively.

9. A method for controlling an auto macro function of a lens module, said lens module comprising a magnet yoke, wherein said magnet yoke comprises a cylindrical inner wall, an outer wall and a top wall, wherein said top wall is outwardly extended from an upper edge of said cylindrical inner wall, and said outer wall is downwardly and axially extended from a periphery of said top wall, wherein said outer wall comprises multiple extension slices, multiple magnets are attached on inner surfaces of respective extension slices of said magnet yoke, a single spring and said single spring disposed above said magnet yoke and a lens holder supporting a coil and a lens, said magnets axially surrounding said coil and being separated from said coil by a gap, said method comprising steps of:

connecting a power source with a first terminal of said coil;

connecting one of two terminals of a transistor of a control switching module to a second terminal of said coil through a current-limiting resistor of said control switching module and a ground terminal such that said power source, said coil, said control switching module and said ground terminal are connected in series, wherein said control switching module is operated at either a first switching state or a second switching state;

issuing a control signal having a first signal state and a second signal state to said control switching module; and transmitting a constant current from said power source to said coil when said control switching module is operated at said first switching state in response to said control signal at said first signal state, wherein said magnets attached on said magnet yoke provide a permanent magnetic field, and said current passing through said coil causes a magnetic force to be generated on said coil while moving said lens holder toward said magnet yoke by a constant distance, wherein said constant distance is determined according to a gap selected from the groups consisting of between said flange and a bottom of said cylindrical inner wall of said magnet yoke and between several salient structures on an upper edge of said lens holder and a bottom of said upper coupling element, so that said lens holder is sustained against said spring, and stopping transmitting said constant current from said power source to said coil when said control switching module is operated at said second switching state in response to said control signal at said second signal state, wherein a restoring force generated by said deformed spring causes said lens holder to return to its original position.

10. The method according to claim 9 wherein said single spring is a single flat spring including a lower inner rim, an upper outer rim and an elastic serpentine structure between said lower inner rim and said upper outer rim, which are connected with each other and disposed on the same plane.

11. The method according to claim 9 wherein said outer wall is annular and downwardly and axially extended from a periphery of said top wall such that said outer wall encloses said cylindrical inner wall.

12. The method according to claim 9 wherein a flange is circumferentially and outwardly extended from a lower periphery of said lens holder for supporting said coil, wherein said at least one flange includes two horizontal protrusions circumferentially and outwardly extended from said lower periphery of said lens holder and arranged at regular intervals, or said flange is an annular flange circumferentially and outwardly extended from said lower periphery of said lens holder.

13. The method according to claim 12 wherein said control switching module is operated at said first switching state when said transistor is in a saturation mode in response to said control signal at said first signal state, and said control switching module is operated at said second switching state when said transistor is in a cutoff mode in response to said control signal at said second signal state.

14. The method according to claim 13 wherein said first signal state and said second state are a high-level state and a low-level state, respectively.

15. A device for controlling an auto macro function of a lens module, said lens module comprising a magnet yoke, multiple magnets attached on said magnet yoke, a single spring and said single spring disposed above said magnet yoke and a lens holder supporting a coil and a lens, said magnets axially surrounding said coil and being separated from said coil by a gap, said device comprising:

a power source connected with a first terminal of said coil;

a control switching module operated at either a first switching state or a second switching state, wherein said control switching module includes a current-limiting resistor and a transistor having a base and two terminals, and one of said terminals of said transistor is connected to a second terminal of said coil and a ground terminal such that said power source, said coil, said current-limiting resistor, said transistor and said ground terminal are connected in series; and a micro processor for issuing a control signal having a first signal state and a second signal state to said base of said transistor in said control switching module, wherein said magnets attached on said magnet yoke provide a permanent magnetic field, a constant current is transmitted from said power source to said coil when said control switching module is operated at said first switching state in response to said control signal at said first signal state, and said constant current passing through said coil causes a magnetic force to be generated on said coil while moving said lens holder toward said magnet yoke by a constant distance, wherein said constant distance is determined according to a gap selected from the groups consisting of between said flange and a bottom of said cylindrical inner wall of said magnet yoke and between several salient structures on an upper edge of said lens holder and a bottom of said upper coupling element, so that said lens holder is sustained against said spring, wherein said power source stops transmitting said constant current to said coil when said control switching module is operated at said second switching state in response to said control signal at said second signal state, so that a restoring force generated by said deformed spring causes said lens holder to return to its original position.

16. The device according to claim 15 wherein said single spring is a single flat spring including a lower inner rim, an upper outer rim and an elastic serpentine structure between said lower inner rim and said upper outer rim, which are connected with each other and disposed on the same plane.

17. The device according to claim 15 wherein said magnet yoke comprises a cylindrical inner wall, an outer wall and a top wall, wherein said top wall is outwardly extended from an upper edge of said cylindrical inner wall, and said outer wall is downwardly and axially extended from a periphery of said top wall, said outer wall comprises multiple extension slices, said magnets are attached on inner surfaces of respective extension slices of said magnet yoke, and said multiple extension slices of said magnet yoke include multiple extension slices, which have rectangular shapes and are substantially perpendicular to said top wall and arranged at diametrically opposed locations of said top wall at regular intervals.

18. The device according to claim 17 wherein said outer wall is annular and downwardly and axially extended from a periphery of said top wall such that said outer wall encloses said cylindrical inner wall.

19. The device according to claim 17 wherein a flange is circumferentially and outwardly extended from a lower periphery of said lens holder for supporting said coil, wherein said at least one flange includes two horizontal protrusions circumferentially and outwardly extended from said lower periphery of said lens holder and arranged at regular intervals, or said flange is an annular flange circumferentially and outwardly extended from said lower periphery of said lens holder.

20. The device according to claim 19 wherein said first switching state and said second switching state are respectively a saturation mode and a cutoff mode of said transistor, wherein said transistor is operated in said saturation mode when said control signal is at said first signal state, and said transistor is operated in said cutoff mode when said control signal is in said second signal state.

21. The device according to claim 20 wherein said first signal state and said second state are a high-level state and a low-level state, respectively.

* * * * *